United States Patent [19]
Carrock

[11] 3,839,308

[45] Oct. 1, 1974

[54] STYRENE-METHACRYLIC ACID COPOLYMERS AND THEIR PREPARATION

[75] Inventor: Frederick E. Carrock, Paramus, N.J.

[73] Assignee: Dart Industries, Inc., Los Angeles, Calif.

[22] Filed: Oct. 1, 1973

[21] Appl. No.: 402,569

[52] U.S. Cl. .................................. 260/88.1 PC
[51] Int. Cl. ...................................... C08f 15/02
[58] Field of Search ....................... 260/88.1 PC

[56] References Cited
UNITED STATES PATENTS

| | | | |
|---|---|---|---|
| 2,816,890 | 12/1957 | Baer............................. | 260/88.1 PC |
| 2,866,767 | 12/1958 | Fang............................ | 260/88.1 PC |
| 2,868,748 | 1/1959 | Frazier et al................ | 260/88.1 PC |

*Primary Examiner*—Harry Wong, Jr.
*Attorney, Agent, or Firm*—Dr. Arthur S. Collins; Sheldon H. Parker

[57] ABSTRACT

A copolymer of styrene and methacrylic acid having from about 3 to about 15% by weight of methacrylic acid is produced at a polymerization temperature of between about 65° to 120°C. using short half life free radical initiators in a process which employs the continuous or incremental addition of methacrylic acid during at least the first part of the polymerization step. The copolymer produced has excellent tensile properties and a higher heat distortion temperature than the copolymers of styrene and methacrylic acid heretofore known.

10 Claims, No Drawings

STYRENE-METHACRYLIC ACID COPOLYMERS AND THEIR PREPARATION

This invention relates to a new copolymer of styrene and methacrylic acid and a method for its preparation. The new copolymer is, with respect to most of its properties, similar to previously known copolymers of styrene and methacrylic acid, but is characterized by having a higher heat distortion temperature and tensile strength than previously known copolymers of the same monomeric materials. The copolymers, which have from about 3 to about 15% by weight of methacrylic acid, are prepared by an improved suspension polymerization process wherein methacrylic acid is introduced into the polymerization mixture by continuous or incremental addition during the polymerization step.

Copolymers of styrene and methacrylic acid are known to possess good dimensional stability and molding properties, thus making them suitable for use in a wide variety of products. The copolymerization of styrene and methacrylic acid has, however, presented numerous problems associated with obtaining homogeneity. Unless reaction conditions are carefully controlled, one obtains a mixture of polymers, including homopolymers of styrene or methacrylic acid and copolymers of varying composition as well as residual monomers. Such a heterogeneous product would not be expected to possess the advantageous properties desired in the copolymer.

Numerous attempts have been made to obtain a copolymer of styrene and methacrylic acid which would be consistently homogeneous in character. In U.S. Pat. No. 3,035,033, issued to Schweitzer et al, there is described a method of preparing copolymers of styrene and methacrylic acid using a continuous polymerization process in which the feed rates of the two monomers and the withdrawal rate of the copolymer product are carefully controlled. The process taught is a high temperature, self-catalyzing process.

Although styrene/methacrylic acid copolymers may be used for a variety of purposes, the uses are limited by the fact that the copolymer is subject to heat distortion at elevated temperatures. By carefully controlling reaction conditions, it has heretofore been possible to increase the heat distortion temperatures of copolymers of styrene and methacrylic acid. It is desirable, of course, to obtain such copolymers with as high heat distortion temperatures as possible. Moreover, it is desirable to imporve the other physical properties of such copolymers.

Accordingly, it is an object of this invention to provide a process for preparing a consistently homogeneous copolymer of styrene and methacrylic acid.

It is another object of this invention to provide such copolymers having improved physical properties.

It is a further object of this invention to provide a copolymer of styrene and methacrylic acid having improved heat distortion temperatures.

These and related objects are accomplished by means of the process of the present invention, from which is obtained a new copolymer of styrene and methacrylic acid having from about 3 to about 15% by weight of methacrylic acid. The process of the invention comprises polymerizing styrene and methacrylic acid under suspension polymerization conditions, at temperatures of between about 65° to 120°C. In order to obtain a product having this desired homogeneity, it is critical that the methacrylic acid be added in proper amount continuously or incrementally throughout the early stages of the polymerization step.

The copolymer of this invention contains from about 85% to 97% of styrene and from about 3 to 15% of methacrylic acid. Preferably, the copolymer comprises from about 5 to about 8% methacrylic acid, most preferably about 5–7.5% methacrylic acid. The polymerization process employed is a low temperature suspension polymerization process. At these temperatures (65°–120°C.), it is desirable for the reaction to be initiated by a free radical polymerization catalyst. It is essential that these low temperatures be employed in the process of this invention, in order to avoid spontaneous homopolymerization of styrene (before addition of the methacrylic acid) which becomes significant at temperatures of about 125°C. and above.

The process of the present invention is based on the discovery that polymer products having desirable physical properties can be obtained when all the methacrylic acid is added to styrene continuously during the initial part of the polymerization reaction, i.e., all the methacrylic acid should be added before about 50% and preferably about 35% of the styrene has been polymerized.

In the suspension polymerization procedure of the present invention, the styrene monomer is dispersed in water with the aid of organic or inorganic dispersants. One such suspension system is described in U.S. Pat. No. 2,673,194 wherein equal quantities of styrene and water are employed in conjunction with an initiator as well as minor amounts of stabilizer or suspending agent and an anionic surfactant. The polymerization reaction is quite often carried out in a stirred jacketed autoclave. Afte the sytrene suspension has been heated to an elevated temperature at or below the point at which significant polymerization begins to occur, e.g., 70° to 100°C., preferably 85° to 93°C., then methacrylic acid introduction is commenced, concurrently with continued heating of the suspension to a temperature in the range of 90° to 100°C. Under these reaction conditions the addition of all the methacrylic acid extends over a period of 1 to 3 hours, and preferably 1.5 to 2.5 hours. Polymerization continues during methacrylic acid addition until about 50% of the styrene has been polymerized. The reactor temperature can then be raised anytime thereafter to 100° to 120°C., preferably 110° to 115°C., to substantially completely polymerize all the monomeric content in the reactor.

The resultant methacrylic acid-styrene copolymer product is in the form of small beads which are washed to remove dispersants, if present, dried and then optionally converted to pellets by conventional extrusion operations.

The catalysts which can be used in the process of the present invention are well known in the art. Preferably, a two component catalyst system comprising a low temperature initiator and a higher temperature initiator is employed. As low temperature initiators may be named organic peroxides such as benzoyl peroxide, caproyl peroxide, lauroyl peroxide, t-butyl peroctoate, cyclohexanone peroxide and decanoyl peroxide; and other free radical catalysts such as azo-bis-isobutyronitrile. All of the foregoing readily decompose at low polymerization temperatures. The higher temperature initiator can be, suitably, t-butyl peracetate, t-butyl perbenzoate or t-butylperoxy isopropyl carbonate.

The amount of benzoyl peroxide or other low temperature organic peroxide employed will vary from about 0.03 to 1%, preferably 0.08 to 0.25% by weight based on the total weight of the polymerizable monomeric feed material, e.g., styrene. The second initiator will vary in amounts from about 0.01 to 0.25%, and preferably about 0.05 to 0.15%, by weight based on the total weight of the polymerizable monomeric feed material.

As previously noted, the suspension polymerization may be carried out in the presence of an organic or an inorganic suspending agent. Suitable materials include tricalcium phosphate, hydroxyethylcellulose, carboxymethylcellulose, polyvinyl alcohol, soluble acrylic acid copolymers, talc, bentonite, etc. For the present invention, the use of hydroxyethylcellulose is described. The amount employed will range from about 0.1 to 0.3% by weight based on water.

It will also be understood that other conventional additives such as lubricants, dyes, plasticizers, stabilizers, and the like may also be employed either in the reaction mixture or dispersed in the polymer prior to the aforementioned extrusion step. Minor amounts of such additives will be employed and generally the amount of each of these additives will not exceed 5% by weight based on the total weight of the reaction mixture, or polymer product.

The styrene/methacrylic acid polymers, produced by the process of this invention, are equivalent in most properties to the styrene/methacrylic acid polymers heretofore known. Heat distortion temperature of the polymers prepared by this process is higher than that exhibited by previously knwon polymers of styrene and methacrylic acid. Also, adhesion to glass fibers is somewhat improved. So also is tensile strength. These properties render the copolymers of this invention superior for many uses, including particularly in automobile bodies and parts.

The following examples illustrate a method of practicing the process of this invention and also the preparation of the copolymer products of this invention. The examples are included here for the purposes of illustration only and are not to be construed as limitations.

EXAMPLE 1

Run A — Represents this invention — Continuous Addition of Methacrylic Acid

To a reactor charged with 100 parts water at 75°C. was added 0.3 parts of Natrosol 250 HR (hydroxyethylcellulose) surfactant powder and the mixture was mixed for 20 minutes. 95 parts of styrene, 0.18 parts of benzoyl peroxide and 0.05 parts of t-butyl peracetate were added and the mixture was heated to 90°C. to polymerize. When 88°C. was reached, five parts methacrylic acid without interruption of heating was introduced continuously over 2 hours. After completion of methacrylic acid addition, an additional 2.5 hour reaction time at 90°C. was maintained before heating to 115°C. After 2.5 hours at 115°C. the bath was cooled and discharged. The polymeric product was isolated as free flowing beads by washing on a centrifuge and air drying.

Run B — Represents Prior Art — Batchwise Addition of Methacrylic Acid

The procedure employed in this Run B follows that of Run A, except that the methacrylic acid was added batchwise simultaneously with the addition of styrene.

EXAMPLE 2

Physical Properties of Products of Run A and Run B

The copolymeric products of Run A and Run B were admixed with zinc stearate at the rate of 0.16 g per pound of each coplymer, molded and then tested to determine physical properties. The results are shown in the following table.

Table I

| Material & Properties | Run A | Run B |
|---|---|---|
| Styrene | 95% | 95% |
| Methacrylic acid | | |
| percent | 5 | 5 |
| method of addition | continuous | batchwise |
| Melt Index, 190°C., 5 kg | 0.4 | 0.6 |
| Izod Impact, ⅛" notched, R.T., ft.lbs./in | 0.3 | 0.3 |
| Tensile Fail, p.s.i. | 9360 | 7660 |
| Elongation at Fail, % | 4.1 | 2.3 |
| Rockwell "M" Hardness | 73.5 | 73.1 |
| Vicat Softening Point, °C. | 113.0 | 106.3 |
| Heat Deflection Temp., 264 p.s.i., °C. | 93.8 | 86.5 |

Example 2 demonstrates that the copolymer provided by this invention, though similar to one prepared by prior art procedures, is remarkably improved thereover with respect to tensile strength and thermal properties.

EXAMPLE 3

Preparation of Styrene/Methacrylic Acid Copolymer Containing 7.5% Methacrylic Acid The procedure of Run A and Example 1 was followed identically, except that 7.5% instead of 5% methacrylic acid was copolymerized with styrene. The copolymer had the following properties.

Table II

| | |
|---|---|
| Melt Index, 190°C., 5 kg | 0.6 |
| Izod Impact, ⅛" notched, R.T., ft.lbs./in. | 0.2 |
| Tensile Fail, p.s.i. | 7620 |
| Elongation at Fail, % | 2.4 |
| Rockwell "M" Hardness | 74.3 |
| Heat Deflection Temp., 264 p.s.i., °C. | 95.0 |
| Vicat Softening Point, °C. | 119.3 |

What is claimed is:

1. A process for the preparation of a copolymer of from about 85 to about 97 wt.% of styrene and from about 3 to about 15 wt.% of methacrylic acid which comprises reacting in a reaction zone styrene and methacrylic acid under polymerization conditions, at a temperature of between about 65° and 120°C. in the presence of free radical polymerization catalysts, the methacrylic acid being introduced into the reaction zone after the other reactants and substantially continuously throughout the polymerization reaction at a rate such that substantially all of said acid is added before the degree of polymerization is greater than 50%.

2. The process according to claim 1 in which the catalyst consists of both a high and a low temperature initiator.

3. The process according to claim 1 in which the styrene is suspended in water containing hydroxyethylcellulose.

4. The process of claim 1 wherein all of said acid is added before the degree of polymerization is greater than about 35%.

5. The process of claim 2 wherein the low temperature initiator is benzoyl peroxide.

6. The process of claim 2 wherein the high temperature initiator is either t-butyl peracetate, t-butyl perbenzoate or t-butylperoxy isopropyl carbonate.

7. A copolymer of from about 85 to about 97 wt.% of styrene and from about 3 to about 15 wt.% of methacrylic acid produced by the process of claim 1.

8. A copolymer according to claim 7 which consists essentially of from 92 to 95 wt.% of styrene and from 5 to 8 wt.% of methacrylic acid.

9. A copolymer according to claim 8 which consists essentially of about 92.5 wt.% of styrene and about 7.5 wt.% methacrylic acid.

10. The process according to claim 1 in which the styrene is suspended in water containing a dispersant.

* * * * *